United States Patent [19]

Rogers

[11] 4,430,901

[45] Feb. 14, 1984

[54] FLUID METER

[75] Inventor: Ivor T. Rogers, Luton, England

[73] Assignee: Brown Boveri Kent Limited, United Kingdom

[21] Appl. No.: 284,336

[22] Filed: Jul. 17, 1981

[30] Foreign Application Priority Data

Jul. 24, 1980 [GB] United Kingdom ............... 8024246

[51] Int. Cl.³ ............................................. G01F 1/06
[52] U.S. Cl. ............................. 73/861.33; 73/861.79
[58] Field of Search ........... 73/861.79, 861.87, 861.88, 73/861.33

[56] References Cited

U.S. PATENT DOCUMENTS 3,572,118 3/1971 Hilzendegen .................... 73/861.79
3,630,082 12/1971 Frayssinous ..................... 73/861.33

FOREIGN PATENT DOCUMENTS

851751 1/1940 France .............................. 73/861.79
1556640 2/1969 France .............................. 73/861.79
672517 7/1950 United Kingdom ............. 73/861.79

Primary Examiner—Herbert Goldstein
Attorney, Agent, or Firm—Kirschstein, Kirschstein, Ottinger & Israel

[57] ABSTRACT

A fluid flow meter of the type having a vaned rotor mounted in a measuring chamber is provided with a series of inlet apertures arranged around the chamber with each aperture having one face (84) which extends sufficiently in the circumferential direction as to meet the opposite face (90) of the adjacent aperture. Since almost the entire periphery of the chamber wall is formed by apertures the collection of inflowing fluid is maximized while the apertures serve to direct at the rotor vanes (66) jets of fluid which are placed for maximum efficiency.

7 Claims, 6 Drawing Figures

FLUID METER

This invention relates to meters and, particularly, to a flow meter comprising a meter body provided with inlet and outlet ports enabling the meter to be installed in a fluid flow line; a measuring element disposed within the meter body to define a generally cylindrical measuring chamber; a vaned rotor mounted within the chamber for rotation about the axis of the chamber; a series of apertures provided in the measuring element mutually spaced circumferentially of the chamber and arranged to direct fluid flow from the inlet port to the vanes of the rotor in a series of jets perpendicular to the axis of the chamber; measuring element outlet means communicating between the chamber and the outlet port and means associated with the rotor for driving a counting device thereby revolutions of the rotor may be counted to provide a measure of fluid flow through the meter.

One important example of the use of such meters is monitoring the volume of water flowing through a supply pipe in a given period. Clearly, meters used for this purpose must be of high accuracy and it is also important that pressure losses across the meter be kept to a minimum.

An example of a meter of the type of which this invention relates is disclosed in U.S. Pat. No. 4,131,017. Here, as has hitherto been conventional, the measuring element inlet means takes the form of a series of straight sided apertures extending through a cylindrical wall around the measuring chamber. The aperatures are inclined at an angle to the radial direction so as to impart an element of circumferential motion to the in flowing water as is necessary to rotate the rotor, and the circumferentially opposing sides of each aperture converge inwardly so ensuring formation of a satisfactory jet. With careful design, a measuring element having this arrangement of inlet apertures can provide satisfactory accuracy, but there are sizable pressure losses in water flowing through the inlet apertures so that in order to ensure that the pressure loss across the meter as a whole is kept within acceptable limits, it is necessary to provide a meter body having smooth, stream lined passages with no abrupt changes in flow direction. The manufacture of such a stream lined meter body is difficult and in practice usually necessitates the use of sand casting techniques rather than quicker and less expensive techniques such as die casting or forging.

It has been recognized by the present Applicants that if pressure losses across the measuring element inlet means could be reduced, higher losses in the meter body could be tolerated and the meter body could then be manufactured more economically. For this reason and for other reasons, it is one object of the present invention to provide an improved meter of the type defined above in which fluid pressure losses across the measuring element inlet means are reduced.

Accordingly, the present invention is, in one aspect, characterised in that the apertures provided in the measuring element are bounded in the circumferential direction by respective pairs of opposing aperture faces, a corresponding first aperture face of each aperture having a radially inner first throat portion which is substantially tangential to the measuring chamber and which cooperates with a radially outer second throat portion of the opposing second aperture face to form a flow directing throat, and a radially outer portion which is curved convexly of the aperture and which extends sufficiently in a circumferential direction to approach closely the radially outer second throat portion of an adjacent aperture, whereby the radially outward opening of each aperture is large compared with the circumferential spacing between said openings.

Preferably, the second aperture face of each aperture has a radially inner portion which is curved concavely of the aperture and which meets the chamber tangentially.

Suitably, the circumferential extent of each said aperture opening is at least three times greater than the circumferential spacing between said openings.

With a meter according to the preferred form of this invention the radially outward openings of the apertures occupy between the substantially the entire circumference of that portion of the measuring element in which they are provided. The capacity of each aperture to "collect" in-flowing fluid is therefore maximized, this being particularly important for apertures in that part of the circumference of the measuring chamber where fluid from the inlet portion must be substantially reversed in direction before entering the measuring chamber. The curved faces of each aperture lead to progressive rather than abrupt changes in flow direction yet the throat in each aperture can be arranged to give the optimum jet velocity and angle. The curved aperture face disposed radially inward of the throat in each aperture serves to entrain the jet to maintain it at the right angle almost until it strikes the rotor.

Advantageously, the aperture faces comprise respective surfaces of a plurality of fins projecting from a first part of the measuring element in a direction axially of the measuring chamber, each aperture being defined between a pair of adjacent fins, a second part of the measuring element which is separately formed from said first part abutting the fins to bound the apertures in an axial direction.

Suitably, said first and second parts of the measuring element comprise respective plastics mouldings.

It will be appreciated that by arranging for the apertures to lie at the intersection of two separately moulded parts, the moulding operation is considerably simplified—there being no necessity for multi side—withdrawable core pieces.

Water flow meters are usually made in sizes specified by the flow in cubic meters per hour with 10 meters water gauge pressure loss across the meter, standard sizes being 3, 5, 7, 10 or 12 and 20 m³/hr. Often, one meter element will be suitable for use in two meter sizes, the meter size being determined by the dimensions of the body in which the element is placed. Thus one element might be rated as 3–5 m³/hr and another as 7–10m³/hr. Such dual purpose elements must have the low flow accuracy of the lower meter size with the flow capacity of the higher size. It is a further object of the present invention to provide in a meter of the type hereinbefore defined an element capable of functioning with a wider range of meter body sizes.

Accordingly, the present invention is, in another aspect, characterized in that the measuring element outlet means comprises an annular chamber extending around the measuring chamber, a series of outlet apertures formed in the measuring element and communicating between the measuring chamber and the annular chamber and an outlet piece extending from the annular chamber to direct fluid flow from the annular chamber to the outlet port, said outlet piece and said outlet port together defining a bypass orifice forming part of a flow path between the inlet and outlet ports bypassing the measuring chamber, whereby a change in dimension of the outlet port is effective to change the flow rate capability of the meter.

Advantageously, the outlet piece comprises a pipe element extending radially of the annular chamber and aligned with the outlet port.

Preferably, the pipe element extends generally coaxially within the outlet port, said orifice being of annular shape.

In accordance with this feature of the present invention a range of meter sizes from 3 to 20 m$^3$/hr can be produced with the same measuring element, the relative sizes of the element outlet pipe means and the body outlet port in each case giving a different value for that fractionn of the inlet flow which passes through the measuring chamber. The various meter bodies need differ only in the dimension of the outlet port and this considerably simplifies manufacture.

It is usual in water flow meters to provide some means of calibrating the meter. In one known arrangement, the calibration means comprises a channel formed in the meter body so as to enable a small part of the inlet flow to reach the outlet port directly, bypassing the mesuring chamber; a threaded hole intersecting the channel and extending to the exterior of the meter body and a threaded calibration plug engaged in this hole and having a cross drilled bore which cooperates with the channel to a greater or lesser extent as the calibration plug is threaded into or out of the meter body. To prevent tampering with the calibration of the meter, the threaded calibration plug must be sealed to the meter body.

This known arrangement functions satisfactorily but complicates manufacture of the meter. Thus the meter body must be drilled twice and threaded and, on assembly, mounting and sealing of the calibration plug is time consuming. It is a further object of the present invention to provide in a meter of the type hereinbefore defined, an improved calibration means.

Accordingly, the present invention consists, in a further aspect, in a meter of the type hereinbefore defined further provided with a variable orifice forming part of a calibration flow path between the inlet and outlet ports, bypassing the measuring chamber, to enable calibration of the meter through adjustment of that fraction of the fluid flow which bypasses the measuring chamber chacterised in that said variable orifice comprises a housing which intersects the calibration flow path and which is formed by cooperating formations on the measuring element and the meter body respectively and a calibration plug complementarily received in said housing and shaped as on rotation to vary an effective orifice size, the calibration plug being trapped in the housing on assembly of the meter element within the meter body.

Advantageously, the calibration plug is formed with smooth cylindrical surfaces cooperating on rotation of the plug with complementarily shaped smooth surfaces of said housing.

The invention will now be described by way of example with reference to the accompanying drawings, in which.

Figure 1:
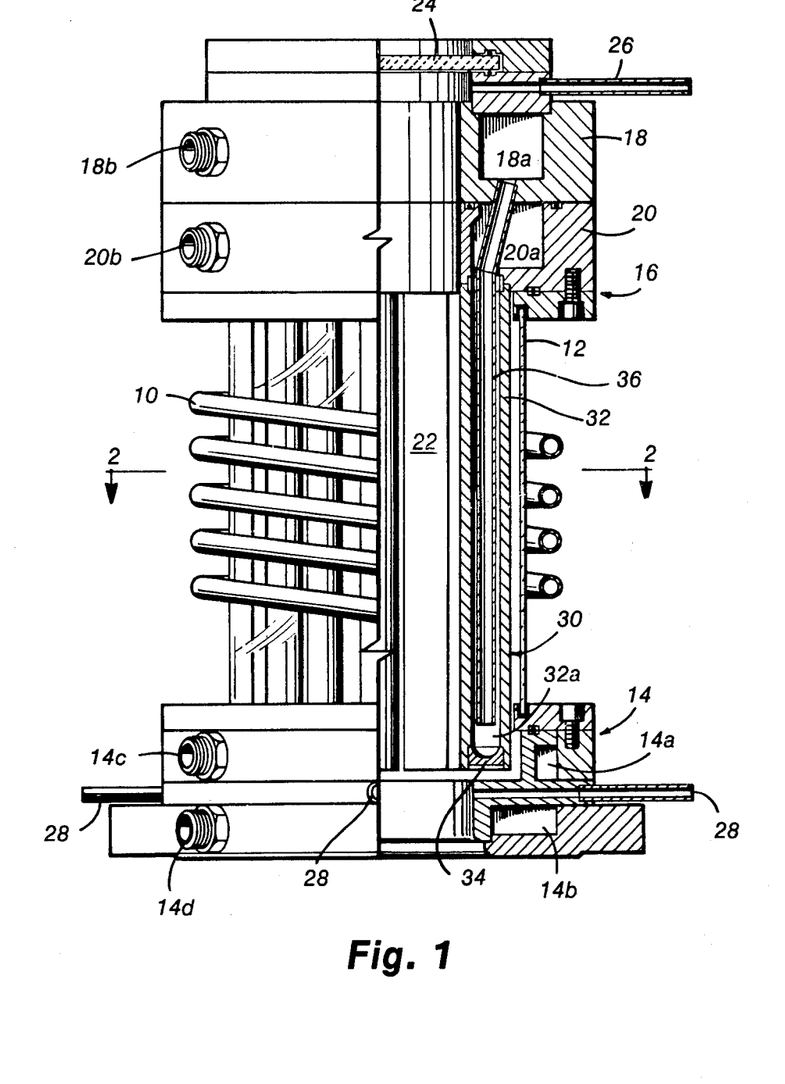
FIG. 1 is a side view in section of a meter according to the present invention.

Referring to FIG. 1, the meter comprises a meter body 10 which is of inverted cup shape having a top wall 12 and a circumferential wall 14. The body includes an inlet port 16 and an outlet port 18, these being externally threaded to enable the meter to be installed in a water supply pipe. The length of the inlet and outlet ports conform with an appropriate standard and the interior bores of the two ports converge toward the meter by a suitable amount. A thimble type filter 20 is provided in the inlet port 16; in the case of meters having shorter inlet ports this thimble filter is replaced by a flat disc filter.

A meter element shown generally at 22 is positioned within the meter body 10, a top surface of the element abutting coaxial rings 24 and 25 formed on the inside face of the body top wall 12. The element is held in place through engagement of a bottom surface of the element with a base plate 26 which is screw threaded to the body circumferential wall 14. An O-ring 27 serves to provide a water-tight seal. In a modification (not shown) the body base plate 26 is provided at its centre with a shear type frost plug device serving to project the meter in freezing conditions.

Figure 3:
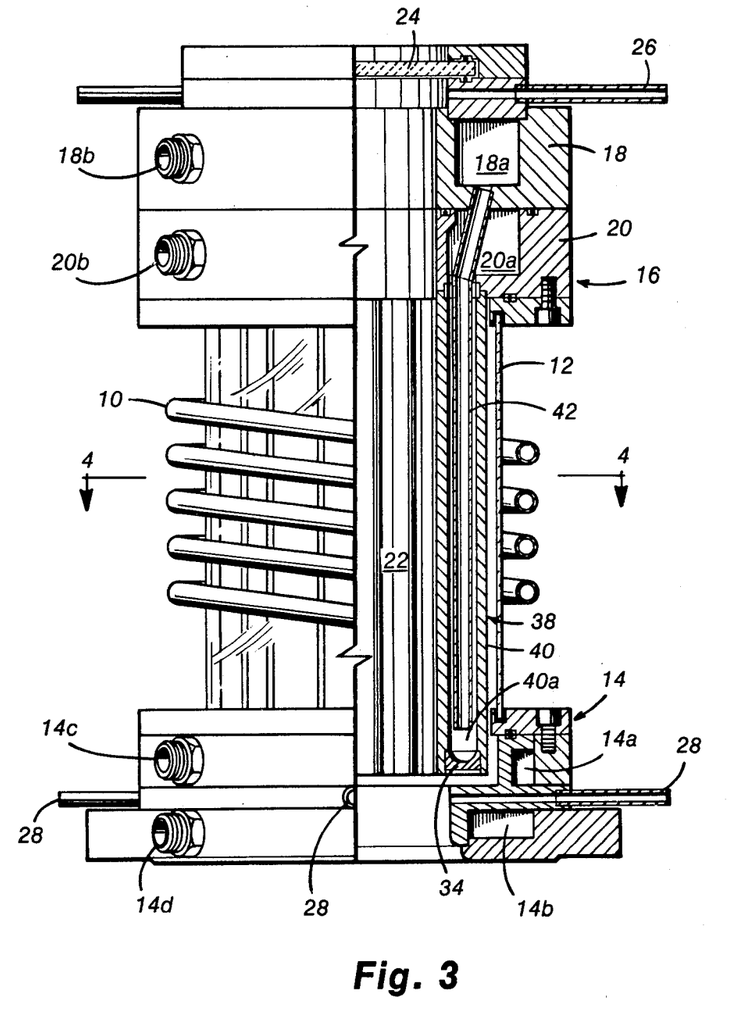
FIG. 3 is a section on an enlarged scale of the measuring element shown in FIG. 1.
Figure 4:
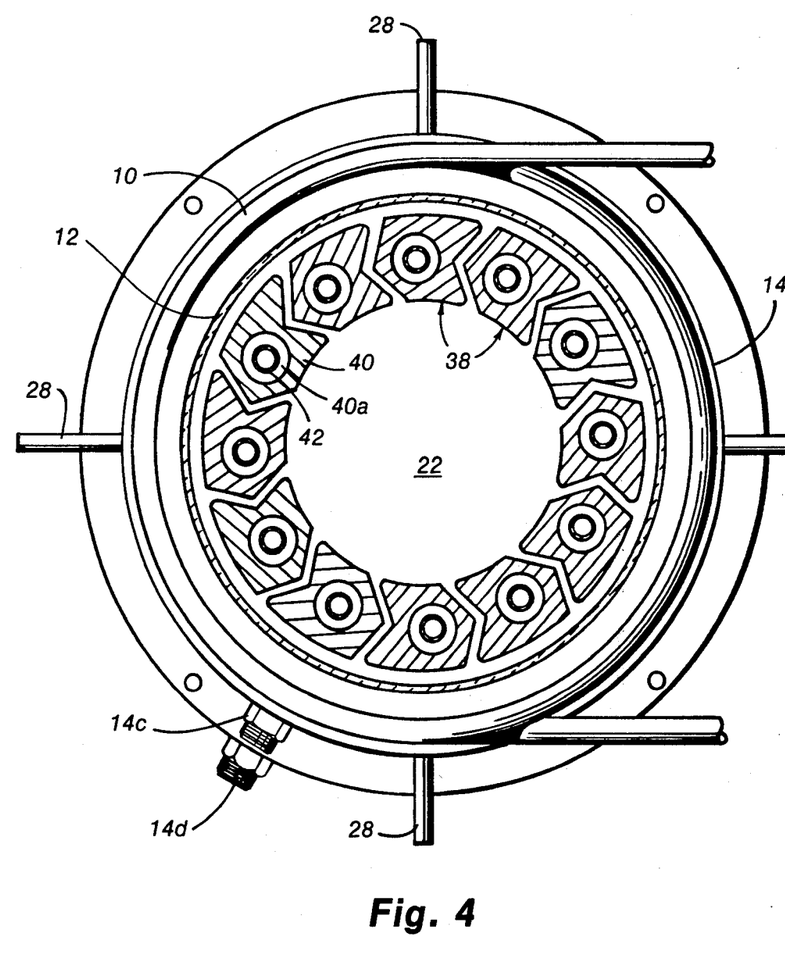
FIG. 4 is a non-planar cross section on ABCD of FIG. 3.

Referring now also to FIGS. 3 and 4, the meter element 22 is formed in two separately injection moulded parts, an upper part 28 and a lower part 30. The lower part 30 comprises a central collar 32 providing a mounting for a rotor spindle 33; a circular plate 34 formed on its upper surface with eight radially extending ribs 36; a peripheral rim 38 and a flange 40. A series of holes (not shown) are provided in the flange 40 to receive respective pins on the meter element upper part 28 so locating the two parts of the meter element.

The upper part 28 of the meter element comprises a top wall 42; inner and outer coaxial cylindrical walls 44 and 46 respectively and an annular plate 48 extending radially of the measuring element between the inner and outer cylindrical walls 44 and 46 respectively. A series of eight fins 50 spaced circumferentially around the measuring element extend downwardly from the annular plate 48 toward the flange 40 of the measuring element lower part. As will be described in more detail hereinafter, the fins 50 together with the annular plate 48 and flange 40 define inlet apertures for the measuring element. The inner cylindrical wall 44 is provided with eight circumferentially spaced outlet apertures 52, these apertures being inclined at an angle to the radial direction. The element top wall 42 has on its underside a series of radially directed ribs 54 similar to the ribs 36 provided on the lower part of the measuring element. A short outlet pipe 53 extends radially from the outer cylindrical wall 46 at a location angularly aligned with the outer port 18. In the meter shown in FIG. 1, the end of pipe 53 in fact abuts the body wall 14 about the bore of the outlet port 18 and a sealing O-ring 55 is provided beween the body wall 14 and a flange 57 on the outlet pipe 53.

A rotor assembly 56 is mounted within the measuring chamber defined by inner cylindrical wall 42, fins 50, circular plate 34 and top wall 42. The rotor assembly comprises an axial portion 58 having an internal jewel (not shown) which receives the hardened tip of the rotor spindle 33 and a bearing sleeve (not shown) which engages the rotor spindle near the mounting of that spindle in the collar 32. The rotor assembly further comprises seven vanes 66 extending radially of the axial portion 58. In this way the rotor assembly 56 is pendently supported on the tip of the rotor spindle 33 and in practice the rotor assembly is arranged to have an overall specific gravity slightly in excess of one so that in water the assembly almost floats to reduce the load on the spindle tip/jewel combination to a very low level.

The rotor assembly is provided in the top of the axial portion 58 with a small magnet 68 serving as a part of a drive connection to a counter unit shown in outline only at 70. The counter unit 70 is mounted on a counter locking ring 72 which further supports a hinged cover 74. The counter locking ring 72 is arranged as a bayonet fit onto the meter body top wall 12. The counter provides a visual read out in a sequence of number wheels and counter dials and may also include a disc rotating directly with rotation of the rotor assembly and provided with a reflecting strip enabling rotation of the rotor assembly to be monitored directly by an optical sensor for electronic calibration of the meter.

It will be seen that in operation of the meter, water flowing in through inlet port 16 will pass between the fins 50 into the measuring chamber causing the rotor assembly to rotate. Water will pass out of the measuring chamber through outlet apertures 46 into an annular chamber defined between the inner and outer cylindrical walls 44 and 46 respectively and from this annular chamber through outlet pipe 53 into the outlet port 18. Before describing in detail the shape of the apertures between adjacent fins 50, it will be helpful to consider for comparison purposes, the prior art arrangement shown in FIG. 5.

Figure 5:
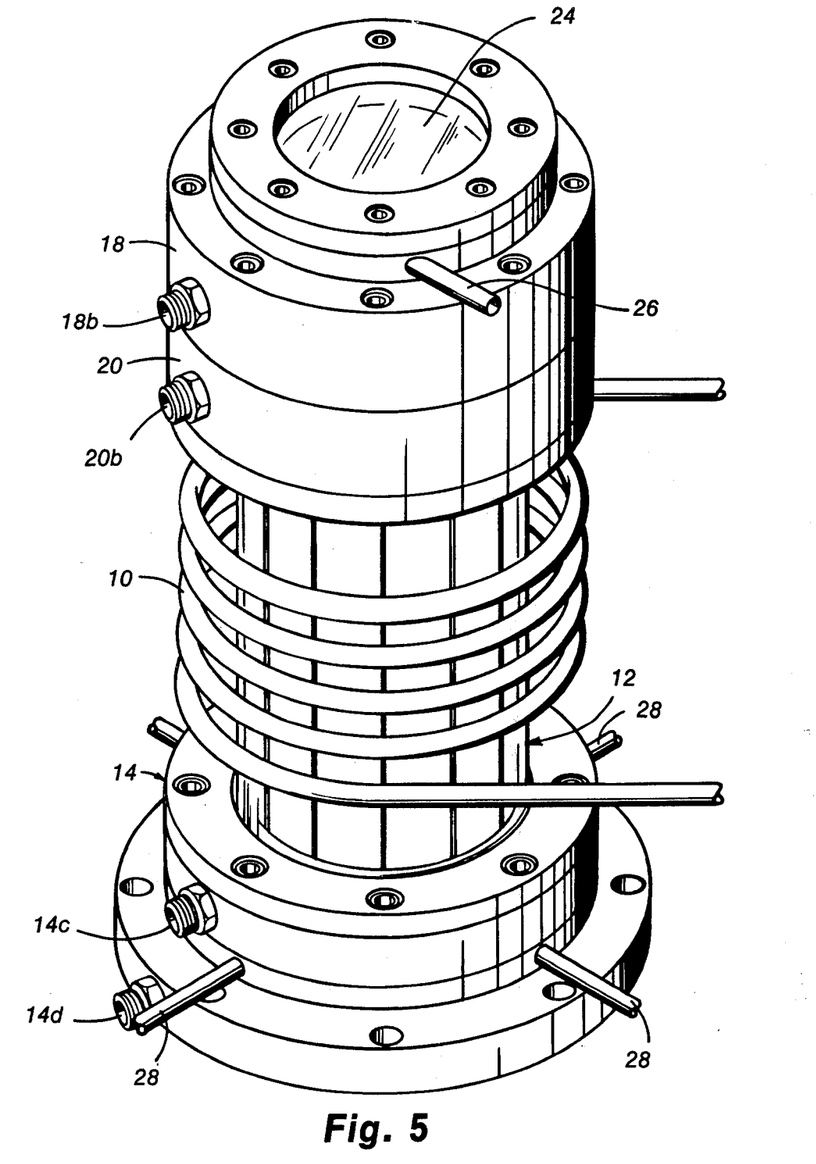
FIG. 5 is a diagrammatic section through a prior art meter, with the directions of fluid flow indicated by arrows.

Referring to FIG. 5, a cylindrical wall 100 of a measuring element is provided with eight apertures 102 equally spaced around the circumference. Each aperture 102 is bounded in in the circumferential direction by opposing aperture faces 104 which are straight and which converge inwardly. It will be appreciated that water flowing inwardly through the apertures 102 has to undergo an abrupt change of direction and the hydraulic pressure losses with this arrangement are found to be significant. It is for this reason, that the meter body—shown diagrammatically in the figure at 106—has to be carefully designed with streamlined fluid passage ways to bring the pressure loss through the meter as a whole down to an acceptable level.

Figure 6:
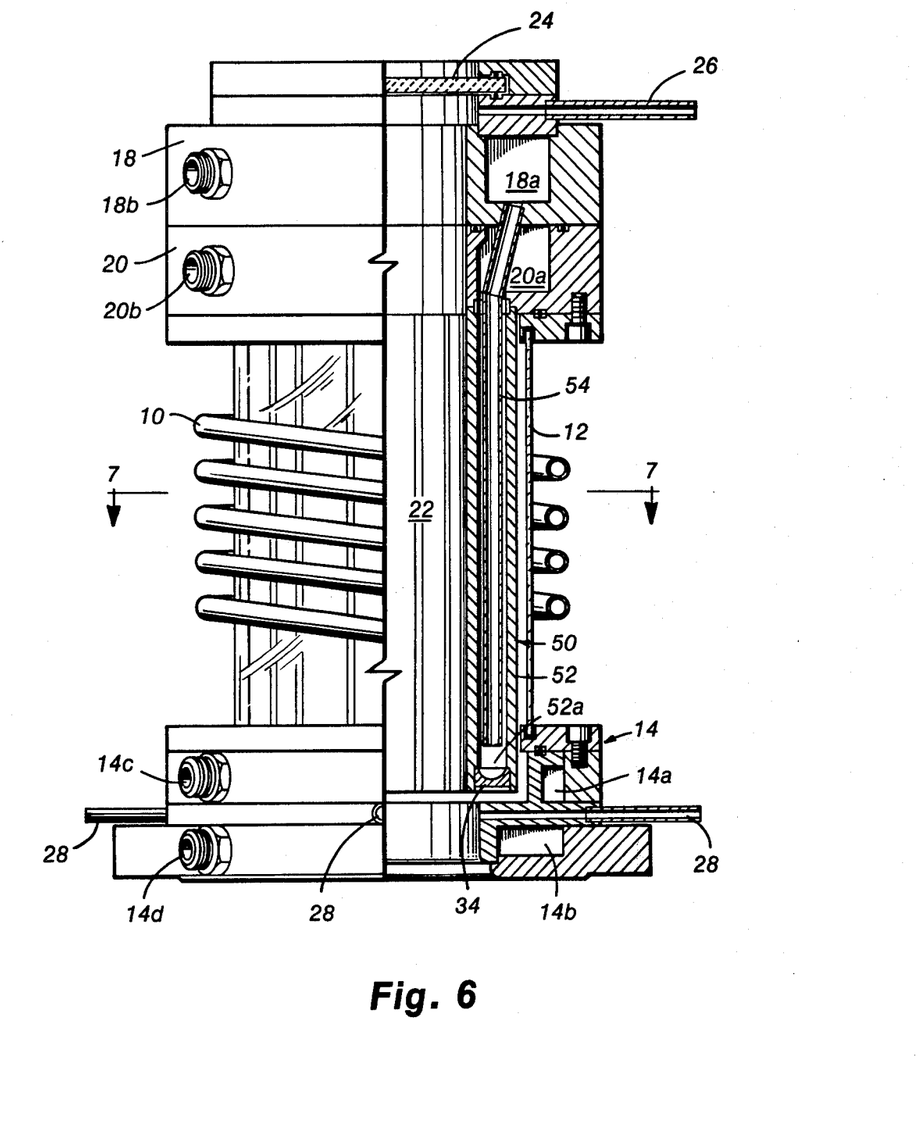
FIG. 6 is a view comparable with FIG. 5 of a meter according to the present invention.
Figure 7:
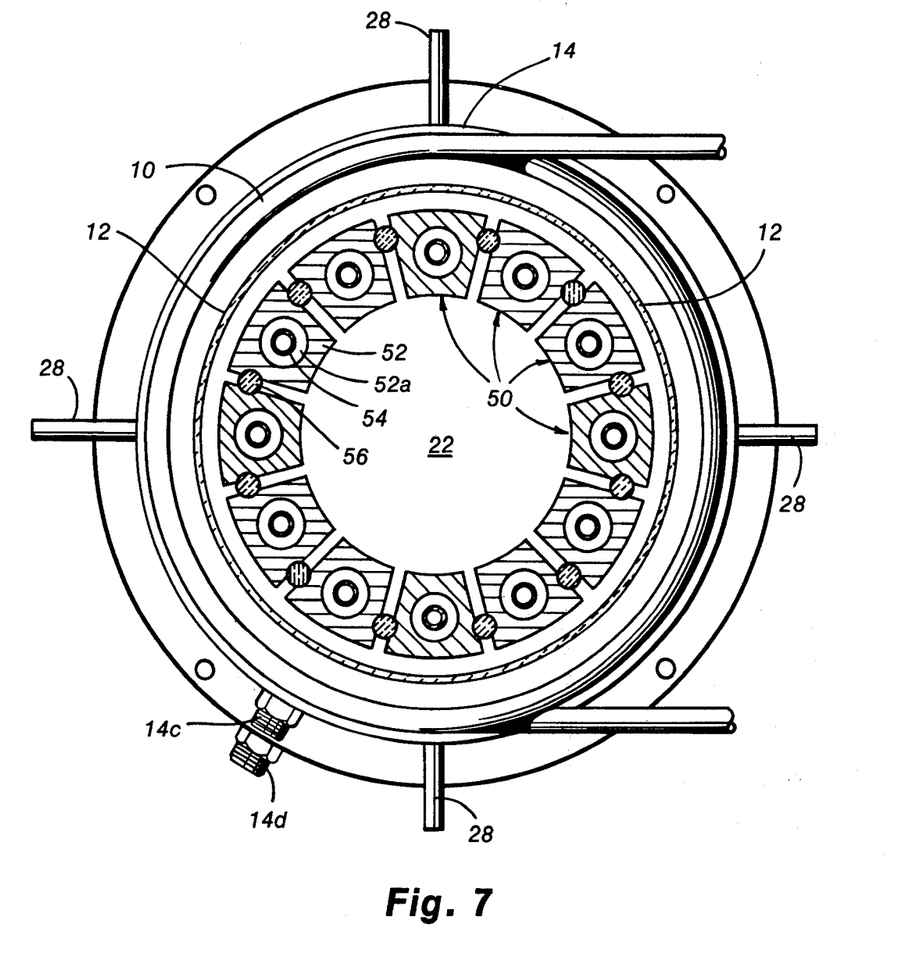
Figure 8:
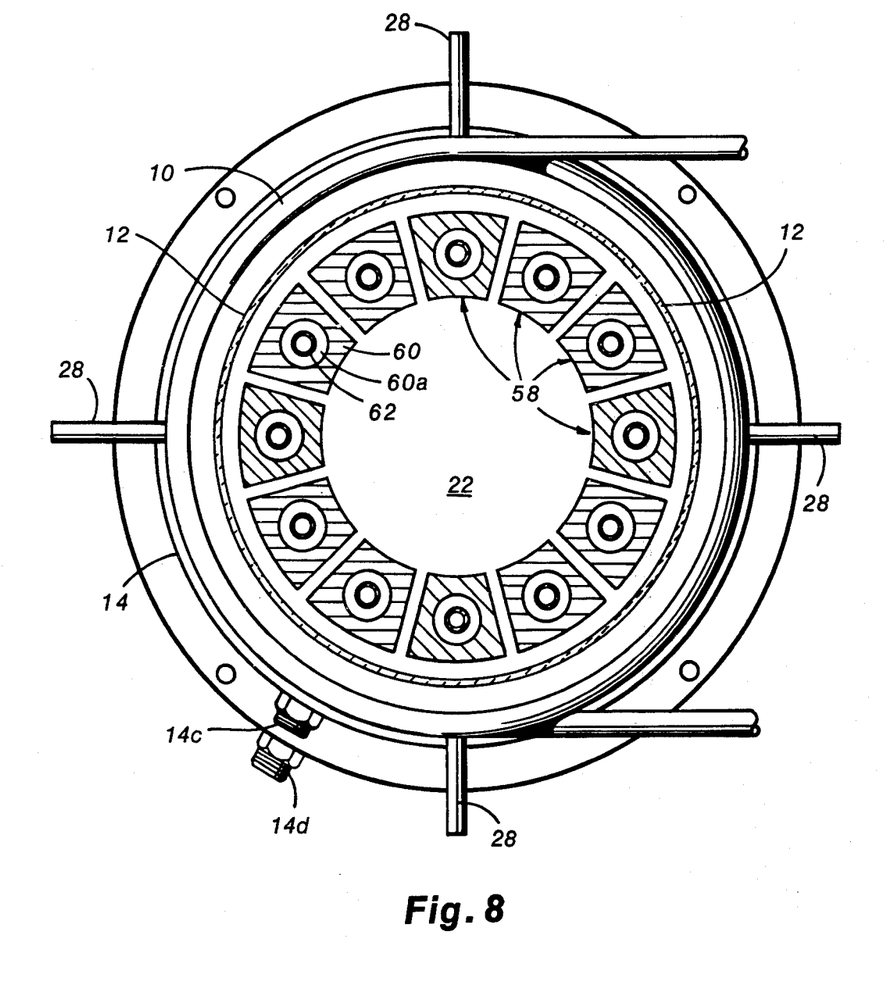

Turning now to FIGS. 4 and 6, the measuring inlet apertures of the present invention are disposed between respective adjacent pairs of fins 50. Each fin 50 has a first aperture face 80 having a straight radially inner portion 82 which is tangential to the measuring chamber and a radially outer portion 84 which is curved convexly and which merges continuously, at its inner end, with the straight portion 82 and, at its outer end, with a land portion 86. The outer side of each fin 50 provides a second aperture face 88 which is of course associated with an aperture adjacent to that associated with the first aperture face of the fin. This second aperture face 88 has a radially outer straight portion 90 merging continuously with a radially inner portion 92 which is curved convexly. The straight portion 90 opposes the straight portion 82 of an adjacent fin to provide a throat 94.

It will be appreciated that since the curved surface 84 of each first aperture face 82 extends a considerable distance in the circumfential direction, the land portion 86 is small compared with the radially outward opening of each aperture. In the illustrated embodiment, the circumferential extent of each opening is approximately six times greater than the circumferential spacing between adjacent openings, this spacing being represented by the land portion 86. Ideally, the dimension of the land portion should be reduced to zero, but this would present considerable moulding difficulties. Because the aperture opening are much greater than the spaces between them, the apertures are very efficient at "collecting" in-flowing water even on the right hand side of the meter as viewed in FIG. 6 where water has to be reversed in direction before entering the chamber in the correct sense.

The angle and separation of straight portions 82 and 90 are selected so that the throat 94 generates a water jet of the correct angle and velocity. Inner curved portion 92 guides the water jet as it leaves the throat 94 so that the torque applied to the roto is maximized.

A further feature of this invention will now be described with reference to FIG. 1. Adjacent the inlet port 16, the body top wall 12 is provided with a cylindrical recess 110. A bore 112 extends from this recess 110 through the top wall 12, there being a shoulder 114 cut between recess 110 and bore 112. A calibration plug 116 in the form of a truncated cylinder is disposed in the recess 110 and has an integral stub portion 118 of reduced diameter which projects into bore 112. An O-ring (not shown) is provided on shoulder 114 to provide a seal between the calibration plug and the meter body.

An orifice 120 extends through spigot 24 of the meter body and—with the recess 110—provides a flow path from the inlet port 16 to the annular chamber between inner and outer cylindrical walls 42 and 44 of the measuring element. Accordingly, water flowing through orifice 120 can pass from the inlet to the outlet aperture without entering the measuring chamber. The stub portion 114 of the calibration plug is provided with a socket enabling the plug to be turned (once the counter unit 70 has been removed) so as partially or completely to block the orifice 120. In this way, the amount of water not contributing to turning of the rotor can be varied to provide a means of calibrating the meter.

During assembly, the calibration plug 116 is first pushed into recess 110 and is then trapped in place when the measuring element 22 is inserted. Since the calibration plug can only be turned after the counter unit has been removed, the seal which is normally provided to prevent tampering with the counter unit can also serve to prevent tampering with the calibration.

Figure 2:
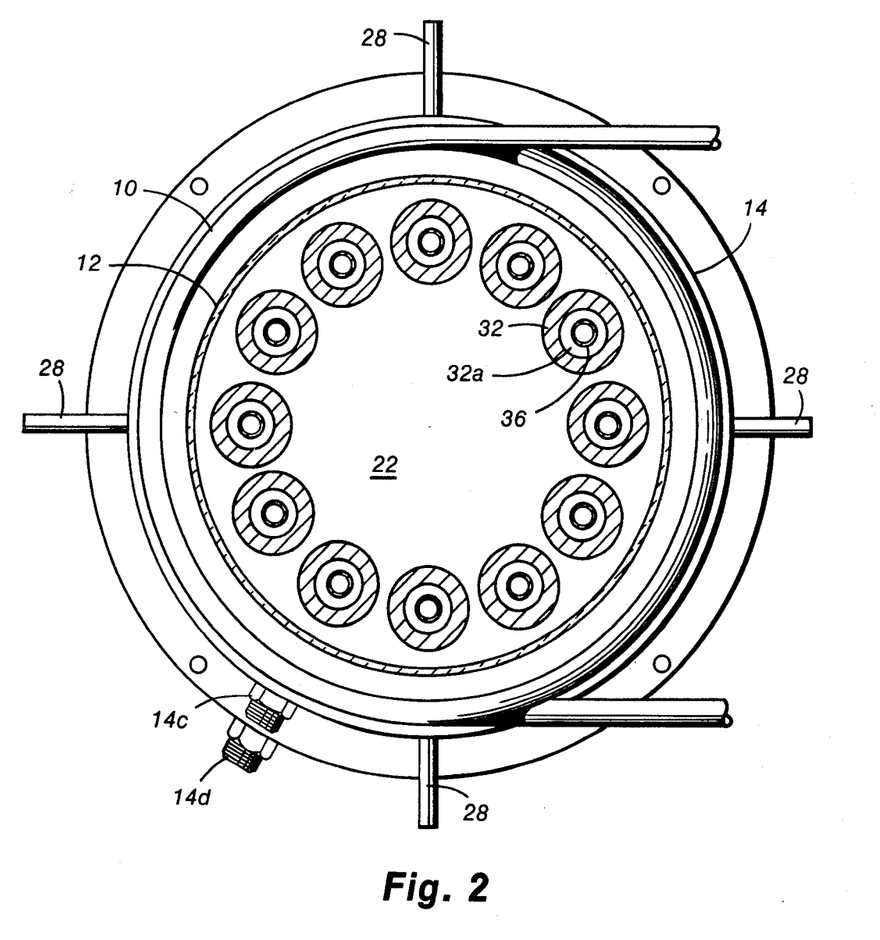
FIG. 2 is a side view partly in section of a further meter, comprising the measuring element from the meter of FIG. 1 in a different meter body.

A further feature of the invention is illustrated in FIG. 2 which shows the measuring element of the meter described above mounted in a meter body of larger size. Both the meter body and the measuring element are shown partially cut away and it will be seen that the outlet pipe 53 no longer abuts the body wall 14 in the region of the outlet port 18, because this outlet port is now of a greater diameter D. The O-ring hitherto provided between the outlet pipe and the outlet port is omitted.

Between the outlet pipe 53 and outlet port 18 there is defined an annular orifice 130 and it is clear that water passing through this orifice has bypassed the measuring chamber. By altering the dimension D the ratio of the flows passing through the metering chamber and bypassing the chamber respectively can be varied, effectively varying the flow rate capacity of the meter. Thus, to give a specific example, if the meter illustrated in FIG. 1 were rated as 3/5 m³/hr, a further meter having the same metering element with the dimension D chosen such that only ½ of the flow passes through the measuring chamber, would have a capacity of 7/10 m³/hr. Decreasing the ratio of water passing through the chamber to 5/12 would up rate the meter to 12 m³/hr and a ratio of ¼ would provide a 20 m³/hr meter. Clearly, the counter gearing ratios in each meter would be varied to take into account the bypass ratio.

It will be appreciated that by arranging in this way for a standard small measuring element to serve a complete family of meter sizes, considerable economies can be made.

The body of the described meters is formed of die cast brass but could also be formed by hot metal forging, sand casting metal or plastic moulding with either thermoplastics or thermoset plastics. Similarly, whilst the described measuring element is formed from injection moulded high impact polystyrene other materials could be used. The magnetic drive between the rotor and the counter unit could be replaced by a direct drive with the counter being, if desired, water lubricated. In other applications, optical means such as that used in the described meter for factory calibration, could be used to provide the counter drive. Whilst this invention has been described with the particular example of water flow meters, it may have useful application to other fluid meters.

I claim:

1. A fluid meter comprising a meter body provided with inlet and outlet ports enabling the meter to be installed in a fluid flow line; a measuring element disposed within the meter body to define a generally cylindrical measuring chamber; a vaned rotor mounted within the chamber for rotation about the axis of the chamber; a series of apertures provided in the measuring element mutually spaced circumferentially of the chamber and arranged to direct fluid flow from the inlet port to the vanes of the rotor in a series of jets perpendicular to the axis of the chamber, each aperture having a radially inner opening and a radially outer opening; measuring element outlet means communicating between the chamber and the outlet port and means associated with the rotor for driving a counting device whereby revolutions of the rotor may be counted to provide a measure of fluid flow through the meter, characterised in that the apertures provided in the measuring element are bounded in the circumferential direction by respective pairs of opposing first and second aperture faces, a first aperture face of each aperture having a radially inner throat portion which is substantially tangential to the measuring chamber, and a radially outer curved portion which is curved convexly of the aperture; the corresponding second aperture face having a radially outer throat portion which opposes the throat portion of said first aperture face and forms therewith a flow directing throat, wherein said curved portion of the first aperture face extends sufficiently in a circumferential direction to approach closely the radially outer throat portion of an adjacent second aperture face, the radially outward opening in each aperture being large compared with the circumferential spacing between said openings.

2. A meter according to claim 1, characterised in that the second aperture face of each aperture has a radially inner portion which is curved concavely of the aperture and which meets the chamber tangentially.

3. A meter according to claim 1 or claim 2, characterised in that the circumferential extent of each of said aperture opening is at least three times greater than the circumferential spacing between said openings.

4. A meter according to claim 1, characterised in that the aperture face comprise respective surfaces of a plurality of fins projecting from a first part of the measuring element in a direction axially of the measuring chamber, each aperture being defined between pair of adjacent fins, a second part of the measuring element which is separately formed from said first part abutting the fins to bound the apertures in an axial direction.

5. A meter according to claim 4, characterised in that said first and second parts of the measuring element comprise respective plastics mouldings.

6. A fluid meter comprising a meter body provided with inlet and outlet ports enabling the meter to be installed in a fluid flow line; a measuring element disposed within the meter body and comprising a cylindrical wall with inner and outer cylindrical wall surfaces, the inner wall surface defining a generally cylindrical measuring chamber; a vaned rotor mounted within the chamber for rotation about the axis of the chamber; a series of apertures provided in the measuring element mutually spaced circumferentially of the chamber and arranged to direct fluid flow from the inlet port to the vanes of the rotor in a series of jets perpendicular to the axis of the chamber; each said aperture being bounded in the circumferential direction by opposing first and second aperture faces and each said aperture having a first opening in said outer wall surface and a second opening in said inner wall surface; measuring element outlet means communicating between the chamber and the outlet port and means associated with the rotor for driving a counting device whereby revolutions of the rotor may be counted to provide a measure of fluid flow through the meter, characterised in that:
(A) each first aperture face has a radially inner throat portion which is tangential to the measuring chamber and a radially outer curved portion which is curved convexly of the corresponding aperture;
(B) each second aperture face has a radially outer throat portion which opposes the throat portion of the corresponding first aperture face and forms therewith a flow directing throat; and
(C) the said curved radially outer portion of each first aperture face extends sufficiently in a circumferential direction to approach closely the said throat portion of the adjacent second aperture face, whereby the circumferential extent in said outer wall surface of the first opening of each aperture is at least three times greater than the circumferential spacing between said openings.

7. A fluid meter according to claim 6 wherein said first openings in the measuring element occupy substantially the entire circumference of said outer cylindrical wall surface.

* * * * *